United States Patent [19]

Maze

[11] Patent Number: 4,608,823
[45] Date of Patent: Sep. 2, 1986

[54] SPRAGLESS TORQUE CONVERTER APPARATUS AND METHOD

[76] Inventor: Robert E. Maze, 823 Crum Creek Rd., Springfield, Pa. 19064

[21] Appl. No.: 752,002

[22] Filed: Jul. 5, 1985

Related U.S. Application Data

[63] Continuation of Ser. No. 491,603, May 4, 1983, abandoned.

[51] Int. Cl.⁴ .............................................. F16D 33/00
[52] U.S. Cl. ...................................... 60/361; 60/365; 415/191; 416/223 A
[58] Field of Search ......................... 60/330, 331–334, 60/345, 361, 362, 364, 365; 415/191, 209, 210, 211; 416/237, 223 R, 223 A, 229 A, 235

[56] References Cited

U.S. PATENT DOCUMENTS

| | | | |
|---|---|---|---|
| 1,927,944 | 9/1933 | Lysholm | 416/223 A |
| 2,435,236 | 2/1948 | Redding | 416/237 |
| 2,634,584 | 4/1953 | Burnett | 60/361 |
| 3,059,834 | 10/1962 | Hausammann | 416/237 |
| 3,125,857 | 3/1964 | Schneider | 60/361 |

FOREIGN PATENT DOCUMENTS

| | | | |
|---|---|---|---|
| 657114 | 2/1963 | Canada | 60/361 |
| 550393 | 1/1943 | United Kingdom | 416/223 A |
| 681815 | 10/1952 | United Kingdom | 416/237 |

*Primary Examiner*—Edward K. Look
*Attorney, Agent, or Firm*—William H. Eilberg

[57] ABSTRACT

A torque converter apparatus having a sprag-type stator is improved by grinding the fluid directing vanes to have a substantially flat surface and by replacing the one-way rotating sprag with a non-rotating solid sprag billet.

4 Claims, 10 Drawing Figures

SPRAGLESS TORQUE CONVERTER APPARATUS AND METHOD

This application is a continuation of application Ser. No. 491,603, filed May 4, 1983, now abandoned.

BACKGROUND OF THE INVENTION

This invention relates generally to power plants having a coaxial impeller and turbine unit and more particularly to those having separate guide or reaction means in a fluid circuit between the impeller and turbine.

DESCRIPTION OF THE PRIOR ART

Torque converters are well known and are generally devices for changing the torque-speed ratio or mechanical advantage between an input member and an output member.

Hydraulic torque converters are derived from simple fluid couplings wherein a rotating driving member (impeller) transmits fluid power to rotate a driven member (turbine). The impeller and turbine members include blades or vanes provided at angles for efficiently moving fluid.

In an elementary hydraulic torque converter, a vaned impeller is rotated by an input member and pumps fluid from near the axis of rotation to an outer rim. Fluid momentum increases because of the greater radius and the influence of the vanes. The fluid leaves the impeller and impinges on the vanes of the turbine, giving up some energy to drive the turbine which is connected to an output member. Fluid discharges from the turbine into a reactor or stator which has airfoil-like vanes having a thick leading edge which tapers to a relatively thin trailing edge. The surfaces of the vanes of the stator are substantially curved to deflect the fluid and redirect it to the impeller. The fluid is deflected to move with the direction of rotation of the impeller rather than against impeller rotation. Such stators were originally fixed to a frame.

As a result of the curved, airfoil-like vanes and the fact that these stators were originally fixed to a frame, they actually created a substantial energy loss on the fluid as it moved from the turbine and returned to the impeller. Eventually, stators were mounted on a sprag, or one-way clutch which permitted the stator to turn with the fluid rather than remaining fixed, thus reducing energy loss and improving efficiency. A limitation here is that the sprag assembly adds to the cost of producing torque converters.

With the advent of high performance racing cars, increased fluid pressures were produced within the torque converters. Sprags have limited durability under these increased pressure conditions and, therefore, failure is quite common. Such failure is in the nature of fractured metal causing fragmentation which can impose substantial damage to the torque converter. Thus, replacement is required causing loss of time and increased expense.

The foregoing illustrates limitations of the known prior art. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a spragless torque converter apparatus including a rotatable impeller member having fluid directing vanes. A rotatable turbine member is adjacent the impeller. The turbine also has fluid directing vanes. A stator member is between the impeller and turbine. The stator includes fluid directing vanes which have at least one substantially flat surface. The stator is fixedly mounted on a stationary member. The stationary member separates a fluid inlet from a fluid outlet.

A method is disclosed for converting a sprag-type torque converter into a spragless torque converter. First a stator member is removed from between the impeller and turbine members of the torque converter. The stator includes fluid directing vanes between an inner and outer ring thereof. The vanes each have curved first and second surfaces. A sprag is mounted in the inner ring and includes a plurality of moving parts. The sprag is removed from within the inner ring. One of the surfaces of each vane is ground in a manner sufficient to be substantially flat. A stationary sprag billet is inserted in the inner ring. The billet has an aperture formed therethrough which is of a construction sufficient for maintaining the billet fixed on a stationary shaft. The billet is free of moving parts. The spragless stator is then mounted between the impeller and turbine.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
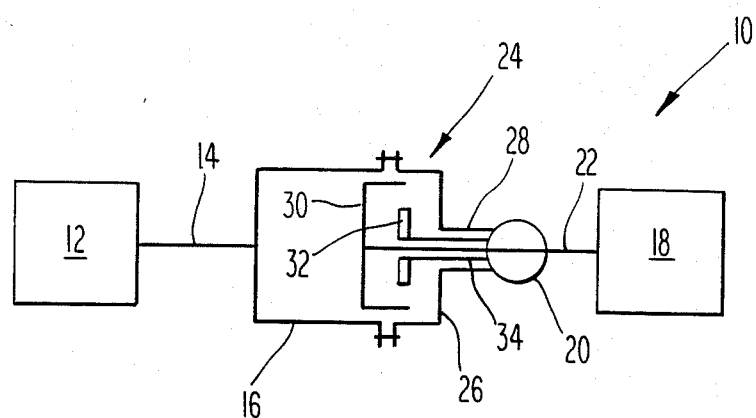
FIG. 1 is a diagrammatic view of a fluid power system illustrating an embodiment of this invention.

Referring now to the drawings, FIG. 1 diagrammatically illustrates a fluid power system generally designated 10 including an engine 12 of the type used to power a vehicle. An output or crankshaft 14 extends from engine 12 and is rotated due to power supplied by engine 12. A housing 16 is connected to crankshaft 14 in a suitable manner so that housing 16 rotates with crankshaft 14. A vehicle transmission 18 includes a fluid pump 20. Transmission 18 is powered by an input shaft 22.

Engine output shaft 14 and transmission input shaft 22 are hydraulically coupled by a torque converter generally designated 24. An impeller 26 of converter 24 is suitably connected to housing 16 so that impeller 26 is rotatably driven by housing 16. Impeller 26 includes a hub 28 which is ultimately connected to drive the pump 20 via a gear (not shown). A turbine 30 of converter 24 is fixedly mounted on, and rotates with, input shaft 22. A stator 32 is fixedly mounted on a stationary shaft 34 which is connected to pump 20.

Figure 2:
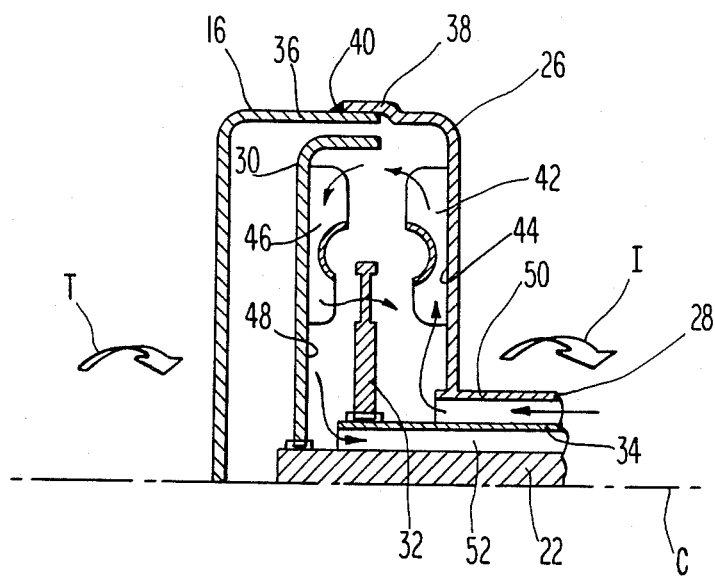
FIG. 2 is a partial diagrammatic view illustrating an embodiment of an impeller, turbine and stator of this invention.
Figure 4:
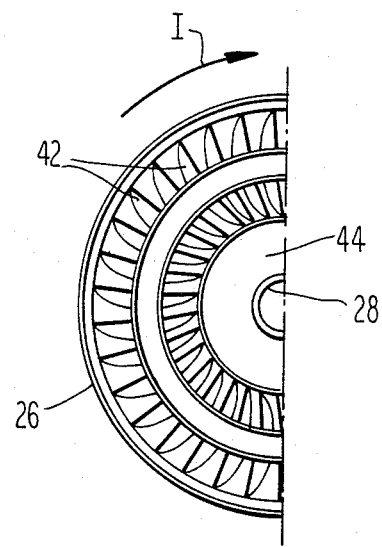
FIG. 4 is a partial plan view taken along line 4—4 of FIG. 3.
Figure 3:
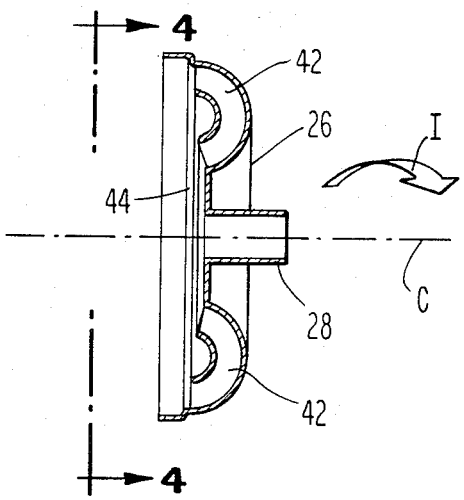
FIG. 3 is a cross-sectional side view illustrating an embodiment of the impeller of this invention.

The annular rim of housing 16, as seen in FIG. 2, includes a plurality of flanges 36 each connected to an associated flange 38 of impeller 26 by a suitable means such as weld 40. A plurality of steel vanes 42 are preferably welded to inner surface 44 of impeller 26 (see FIGS. 2, 3 and 4). Impeller 26 is fixedly attached to cylindrical hub 28 coaxially mounted with respect to an exemplary centerline designated C. Impeller 26 is rotated in a direction indicated by a directional arrow designated I.

Figure 6:
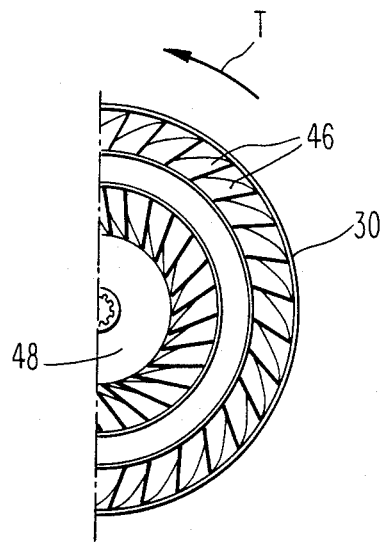
FIG. 6 is a partial plan view taken along line 6—6 of FIG. 5.
Figure 5:
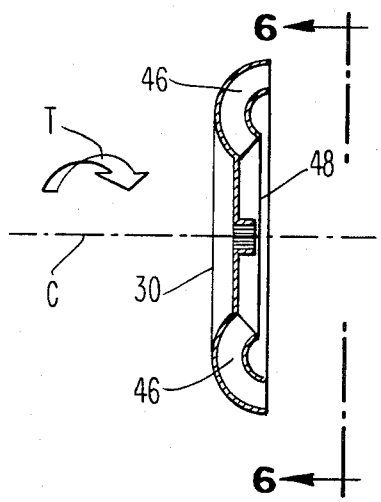
FIG. 5 is a cross-sectional side view illustrating an embodiment of the turbine of this invention.

Turbine 30, FIGS. 2, 5 and 6, includes a plurality of steel vanes 46 preferably welded to inner surface 48 of turbine 30. Turbine 30 is splined onto solid steel shaft 22 which is coaxially mounted with respect to hub 28 and centerline C. At idle and slow speeds, impeller 26 rotates, but insufficient fluid pressure is present to drive turbine 30. As fluid pressure increases due to increasing speed, turbine 30 is rotated with shaft 22 in the same direction as impeller 26 indicated by a directional arrow designated T.

Cylindrical hub 28 and cylindrical shaft 34 define a fluid inlet passage 50. Cylindrical shaft 34 and solid shaft 22 define a fluid outlet passage 52. This is accomplished by providing shaft 34 with a diameter greater than shaft 22 and providing hub 28 with a diameter greater than shaft 34.

Directional arrows indicate a path of travel of fluid entering inlet passage 50. Vanes 42 direct fluid radially outwardly from hub 28 as fluid momentum is increased and the fluid assumes the rotational direction of impeller 26. The fluid leaves impeller 26 and impinges on vanes 46, and at sufficient fluid pressure, drives turbine 30 in the same direction as impeller 26. The fluid is directed radially inwardly toward shaft 22 and outlet 52 and assumes a backspin, that is, the fluid spins in a direction opposite to the direction of spin of impeller 26. Thus, without the presence of stator 32, the backspinning fluid would impede rotation of impeller 26 thus causing a substantial power loss.

Figure 7:
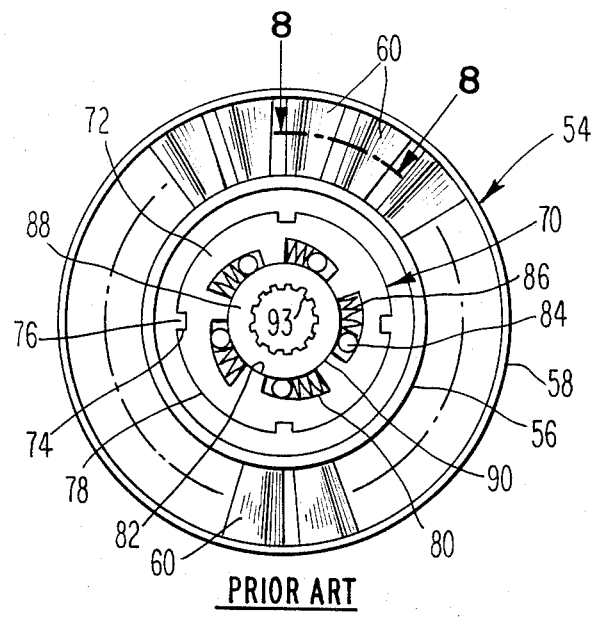
FIG. 7 is a plan view of a known sprag-type stator.
Figure 8:
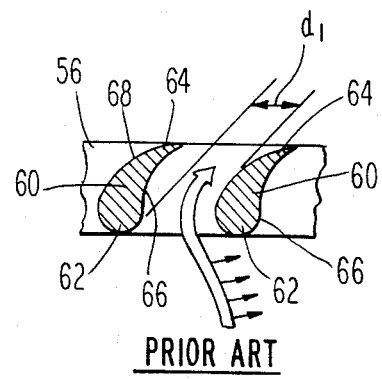
FIG. 8 is a view of the vanes of the sprag-type stator taken along line 8—8 of FIG. 7.

A well known aluminum sprag type stator 54 is illustrated in FIGS. 7 and 8. Stator 54 includes an inner ring 56 and an outer ring 58. A plurality of fluid directing vanes 60 interconnect rings 56 and 58. Vanes 60, when viewed in cross-section, extend from a first leading edge 62 and taper to a second trailing edge 64, similar to an airfoil. Opposite surfaces 66 and 68 of each vane 60 are substantially curved for redirecting back-spinning fluid to the direction of rotation of impeller 26.

A steel sprag 70 is mounted within inner ring 56 and comprises stationary and moving parts. A first member 72 is mounted within inner ring 56 in a fixed position. This is accomplished by providing a plurality of keys 74 on stator 54 to engage a matched plurality of associated keyways 76 formed on outer annular surface 78 of first member 72. Several tapered slots 80 are formed in an inner annular surface 82 of first member 72. Each tapered slot 80 includes a steel roller bearing 84 and a resilient member 86 such as a steel spring. A second member 88 has an outer annular surface 90 rotatably mounted in engagement with inner surface 82 and includes a splined opening 93 for fixed engagement with stationary shaft 34.

As viewed in FIG. 8, when fluid pressure is insufficient to move turbine 30, fluid leaving turbine 30 approaches vanes 60 in a direction exemplified by a large directional arrow and is redirected due to impingement upon curved surface 66 of each vane 60. The force of the impinging, back-spinning fluid is capable of rotating stator 54 in a counter-clockwise direction (as viewed in FIG. 7). However, this does not occur due to the one-way braking action of the roller bearings 84 in tapered slots 80. At sufficient pressure, turbine 30 moves in the same direction as impeller 26, but fluid continues to leave turbine blades 46 in the direction exemplified by the previously mentioned directional arrow. However, the fluid is swept across vanes 60 in a direction exemplified by a plurality of small directional arrows attached to the large arrow. As a result, fluid flow past vanes 60 causes clockwise rotation (as viewed in FIG. 7) of sprag stator 54 about surface 90 of stationary second member 88. This rotation causes roller bearings 84 to compress resilient members 86. The well-known, oneway movement of sprag-type stator 54 reduces resistance to fluid flow and accomplishes redirection of the fluid to spin with, rather than against, impeller 26. If stator 54 did not spin, vanes 60 would present substantial resistance to fluid flow in view of a limited distance $d_1$ between each vane 60.

The several moving parts of sprag-type stator 54 increase production costs, and, in high presssure environments such as in racing cars, costly failure is quite common.

Figure 9:
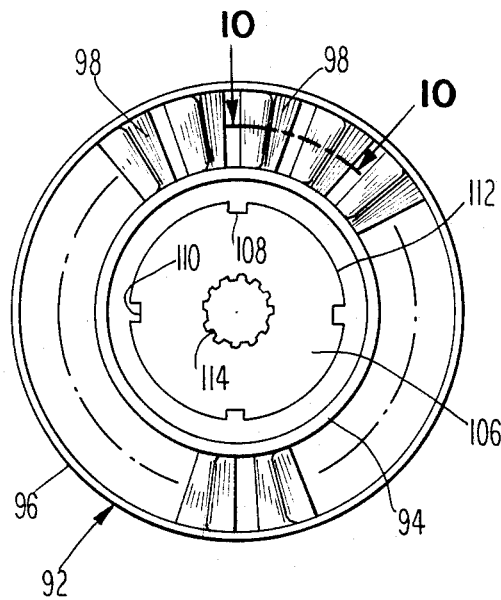
FIG. 9 is a view illustrating an embodiment of the spragless stator of this invention.
Figure 10:
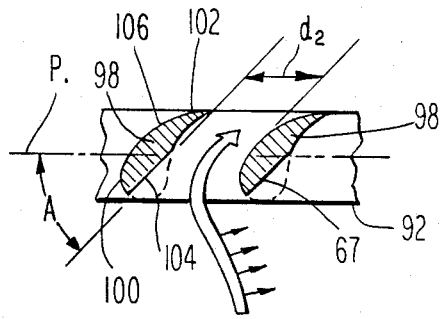
FIG. 10 is a view of an embodiment of the vanes of the spragless stator taken along line 10—10 of FIG. 9.

In accordance with this invention a stator 92, FIGS. 9 and 10, has an inner ring 94 and an outer ring 96. A plurality of fluid directing vanes 98 interconnect rings 94 and 96. Vanes 98, when viewed in cross-section (FIG. 10), extend from a first leading edge 100 to a second trailing edge 102 and include opposite surfaces 104 and 106. At least one of the surfaces 104 is substantially flat and differs from surface 66 of vane 60 due to the absence of the dotted line segment 67 of surface 66. Surface 104 intersects a radial plane, designated P, of stator 92 at a preferred angle, designated A, of from about 45 degrees to about 65 degrees.

In place of the sprag, a billet 106 is mounted within inner ring 94 and is a stationary part. This is accomplished by providing a plurality of keys 108 on stator 92 to engage a matched plurality of associated keyways 110 formed in an outer annular surface 112 of billet 106. A splined opening 114 is provided in billet 106 for fixed engagement with stationary shaft 34.

As viewed in FIG. 10, fluid leaving turbine 30 approaches vanes 98 in a direction exemplified by directional arrows and is redirected due to impingement upon substantially flat surface 104 of each vane 98. The force of the impinging, back-spinning fluid, even at increased pressure, is unable to rotate stator 92 in any direction due to the splined connection of stator 92 and stationary shaft 34. However distance $d_1$, between each vane 60, is substantially increased to a distance $d_2$ between each vane 98 due to the omission of dotted line segment 67. As a result, although stator 92 remains stationary, the fluid meets little resistance passing between vanes 98. Impingement of the fluid on surface 104 results in the desired redirection of the fluid to a direction corresponding with the rotation of impeller 26. Thus, stator 92 is free of moving parts and remains stationary with shaft 34 in response to rotation of impeller 26 and turbine 30 and impingement of fluid on vanes 98.

In further accordance with this invention, a method is disclosed for converting a sprag-type torque converter into a spragless torque converter. Stator 54 is removed from between impeller 26 and turbine 30. Stator 54 is a spragtype having fluid directing vanes 60 between inner ring 56 and outer ring 58. Each vane 60 has curved first and second surfaces 66, 68, respectively. Also, stator 54 has a sprag 70 mounted in ring 56. Sprag 70 includes moving parts such as member 88, roller bearings 84 and resilient members 86.

Sprag 70 is removed from within ring 56. Surface 66 of each vane 60 is ground until surface portion 67 is removed. As a result, surface 66 is ground substantially flat. Vane 60 converted to vane 98 and surface 66 becomes surface 104. Sprag billet 106 is inserted in place of sprag 70 and stator 54 is converted to stator 92 which is then mounted between impeller 26 and turbine 30.

The foregoing describes a spragless torque converter apparatus and a method of converting a well-known sprag-type torque converter into a spragless torque converter by modification to the stator member.

It is anticipated that aspects of the present invention, other than those specifically defined in the appended claims, may be apparent to those skilled in this art from the foregoing description and the drawings. The appended claims are intended to be construed to encompass the present invention including any and all such aspects.

Having thus described the invention, I claim:

1. In a hydraulic torque converter adapted to couple the engine output to the transmission input of an automotive vehicle
    said converter having a turbine, a stator and an impeller disposed successively along a common axis, and including a stationary member,
    said turbine being adapted to cause hydraulic fluid to move toward said impeller in a first direction when the pressure of hydraulic fluid leaving said impeller is insufficient to rotate said turbine and in a second direction when the pressure of hydraulic fluid leaving said impeller is sufficient to rotate said turbine,
    said stator including a plurality of vanes adapted to direct hydraulic fluid in its passage said turbine toward said impeller,
    said vanes having leading and trailing edges and a pair of opposite surfaces extending from said leading edge to said trailing edge, one of said surfaces being convex and the other of said surfaces being concave,
    said concave surface facing said first hydraulic fluid direction and both of said surfaces being generally parallel to said second hydraulic fluid direction,
    the improvement wherein
    said stator is connected to said stationary member, wherein said stator is fixed against rotation and
    said concave surface includes a substantially flat portion extending from said leading edge and extending toward said trailing edge, said portion forming an angle with a radial plane therethrough, as seen in circumferential cross-section, of 45° to 65°,
    wherein the flat portion extends from the leading edge of the vane, toward the trailing edge of the vane, with the downstream end of the flat portion being immediately adjacent the remainder of the concave surface,
    wherein the flat portion permits substantially unrestricted flow of fluid in said second direction, and wherein the vane is substantially free of any extended flat surfaces generally normal to the flow of fluid in said second direction.

2. In an improved hydraulic torque converter, as recited in claim 1, wherein said stator includes inner and outer concentric rings,
    said vanes interconnecting said inner and outer rings,
    said inner ring in turn being fixedly connected to a stationary billet mounted in said inner ring,
    said billet having an aperture formed therethrough,
    said aperture being of a construction sufficient for fixed engagement with a stationary shaft,
    said billet being free of moving parts,
    said stationary billet comprising the means by which said stator is fixed against rotation 3. In a hydraulic torque converter adapted to couple the engine output to the transmission input of an automotive vehicle, said converter having a turbine, a stator and an impeller disposed successively along a common axis, and including a stationary member, said turbine being adapted to cause hydraulic fluid to move toward said impeller in a first direction when the pressure of hydraulic fluid leaving said impeller is insufficient to rotate said turbine and in a second direction when the pressure of hydraulic fluid leaving said impeller is sufficient to rotate said turbine, said stator including a plurality of vanes adapted to direct hydraulic fluid in its passage from said turbine toward said impeller, said vanes having leading and trailing edges and a pair of opposite surfaces extending from said leading edge to said trailing edge, one of said surfaces being convex and the other of said surfaces being concave, said concave surface facing said first hydraulic fluid direction and both of said surfaces being generally parallel to said second hydraulic fluid direction,
    the improvement wherein said stator is connected to said stationary member, wherein said stator is fixed against rotation and wherein said concave surface includes a substantially flat portion extending from said leading edge and extending toward said trailing edge, wherein the flat portion extends from the leading edge of the vane, toward the trailing edge of the vane, with the downstream end of the flat portion being immediately adjacent the remainder of the concave surface, wherein the flat portion permits substantially unrestricted flow of fluid in said second direction, and wherein the vane is substantially free of any extended flat surfaces generally normal to the flow of fluid in said second direction.

4. The improvement of claim 3, wherein said stator includes inner and outer concentric rings, said vanes interconnecting said inner and outer rings, said inner ring being fixedly connected to a stationary billet mounted in said inner ring, said billet having an aperture formed therethrough, said aperture being of a construction sufficient for fixed engagement with a stationary shaft, said billet being free of moving parts, said stationary billet comprising the means by which said stator is fixed against rotation.

* * * * *